Feb. 28, 1961 D. T. AYERS, JR 2,972,983
BOOSTER MECHANISM
Filed Jan. 15, 1958 4 Sheets-Sheet 1

INVENTOR
DAVID T. AYERS, JR.
BY John F. Phief
ATTORNEY

INVENTOR
DAVID T. AYERS, JR.
BY John F. Phillips
ATTORNEY

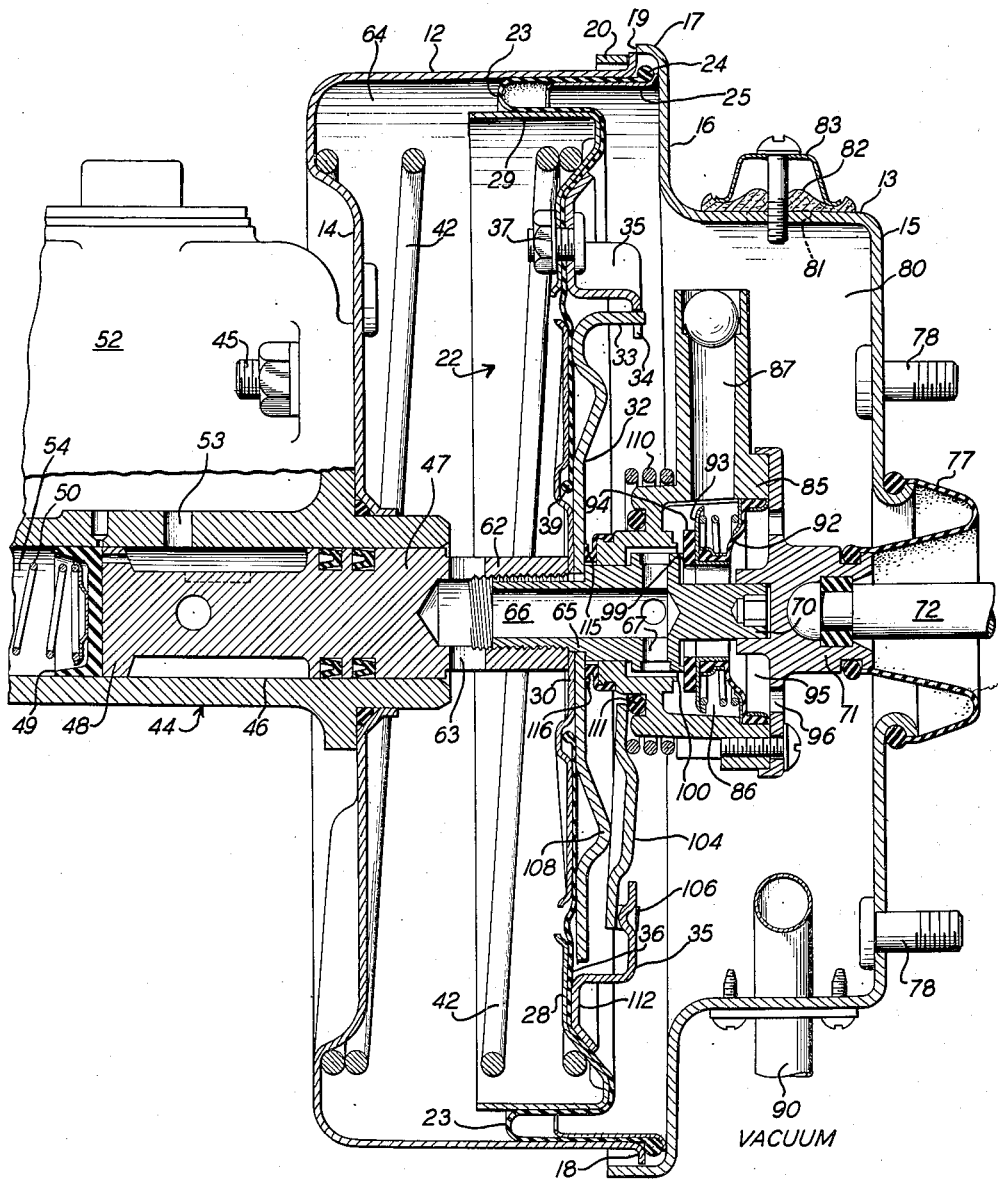

United States Patent Office
2,972,983
Patented Feb. 28, 1961

2,972,983

BOOSTER MECHANISM

David T. Ayers, Jr., Birmingham, Mich., assignor to Kelsey-Hayes Company, Detroit, Mich., a corporation of Delaware Filed Jan. 15, 1958, Ser. No. 709,113

17 Claims. (Cl. 121—41)

This invention relates to a booster mechanism.

An important object of the invention is to provide a novel booster mechanism and particularly a vehicle brake booster mechanism of the direct acting type, that is, of the type wherein the booster motor, its valve mechanism, the pedal operable rod, and the master cylinder are all arranged in axial alinement for the direct transmission of force from the pedal operable rod coaxially through the apparatus.

More specifically, an important object of the invention is to provide a novel combination of elements wherein the response of the booster motor to operation of the brake pedal is highly sensitive and accurate, and wherein accurate reaction is transmitted back through the pedal operable rod to the brake pedal during the application of the brakes.

A further object is to provide such an apparatus wherein an elastic fluid pressure booster motor is employed having a pressure movable unit therein, an annular portion of which is utilized for transmitting reaction forces back through the valve mechanism and pedal operable rod to the brake pedal, thus providing the brake pedal with accurate "feel."

A further object is to provide such an apparatus wherein the forces applied to the pedal operable rod, in a later stage of substantial brake application, are transmitted axially through the apparatus to the master cylinder plunger to assist in applying the brakes.

A further object is to provide such an apparatus wherein the annular portion of the pressure responsive unit of the motor utilized for transmitting reaction forces to the brake pedal is connected to the valve mechanism to act therethrough by a series of radially arranged levers which operate not only to transmit accurate reaction to the brake pedal but also to distribute the reaction forces circumferentially around the pressure responsive unit and associated parts.

A further object is to provide an apparatus of this character having a novel combination of an accurate follow-up control valve mechanism with a novel type of atmosphere-suspended motor wherein, in effect, a single motor casing is employed and the pressure responsive unit, the valve mechanism and reaction transmitting means are all arranged within such casing.

A further object is to provide an apparatus of the character just referred to wherein the motor casing, in effect, is a single unit and employs an annular shoulder to limit movement of the pressure responsive unit to its off position, thus eliminating the necessity for providing stop means arranged adjacent the axis of the apparatus, thereby simplifying the structure of the master cylinder plunger and associated elements.

Other objects and advantages of the invention will become apparent during the course of the following description.

In the drawings I have shown one embodiment of the invention. In this showing:

Figure 4 is a similar view with the parts shown in operative positions with the brakes partially applied.

Figure 1:
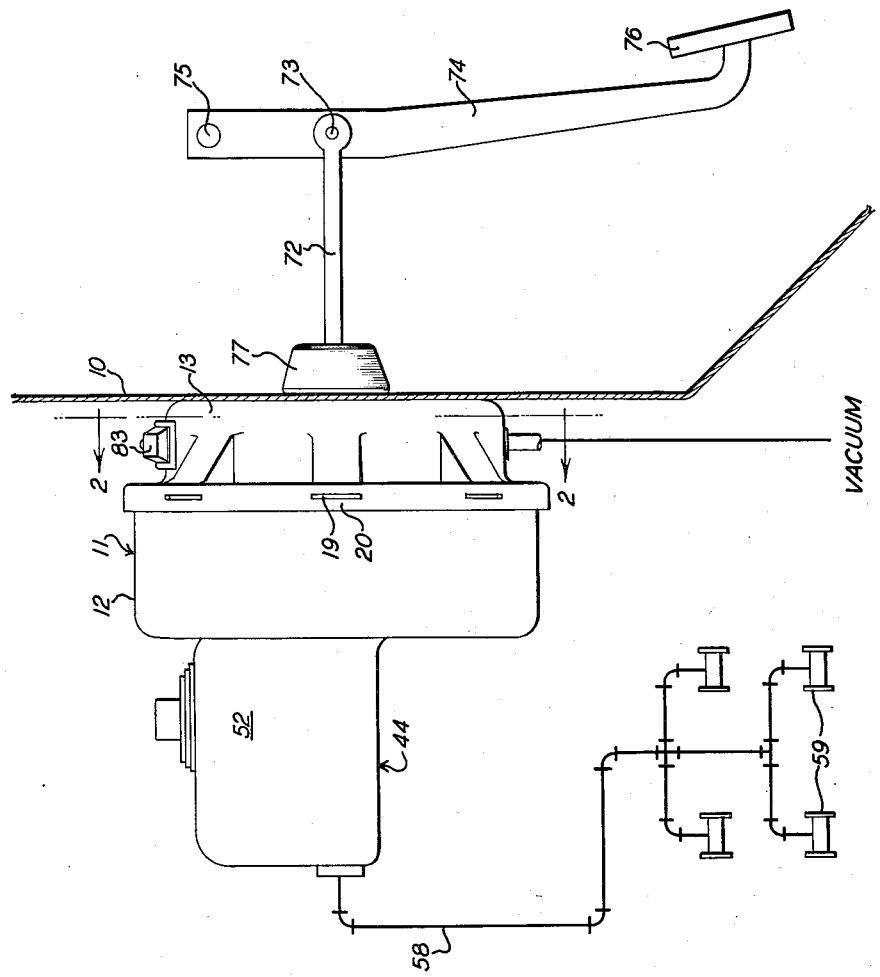
Figure 1 is a side elevation of the apparatus mounted in position on the vehicle fire wall, which is shown in section, the wheel cylinders and associated piping connections being diagrammatically shown.

Referring to Figure 1, the numeral 10 designates the fire wall of a motor vehicle against the forward face of which is secured, as referred to below, a motor indicated as a whole by the numeral 11. This motor comprises a pair of casing sections 12 and 13 which, as will become apparent, constitute in effect a unitary casing. The casing 12 is of larger diameter than the casing 13 and is provided at one end with a solid wall 14. The remote end of the casing section 13 is also provided with a wall 15. At its end adjacent the casing section 12, the casing 13 is provided with a wall 16, perpendicular to the axis of the motor casing, and forming an annular shoulder for a purpose to be described. The outer extremity of the wall 16 is turned longitudinally to form an annular flange 17 surrounding a narrow out-turned annular flange 18 formed on the casing 12. At circumferentially spaced points, the flange 17 is provided with circumferentially extending slots 19 to form flange portions 20 which, when the casing members are assembled, are bent inwardly behind the flange 18 to lock the casing sections together. This arrangement eliminates the use of outstanding annular flanges and bolts or similar elements for securing the casing sections together, thus reducing the over-all diameter of the motor.

The motor is provided with a pressure responsive unit indicated as a whole by the numeral 22. This unit comprises a rolling diaphragm 23 having a radially outer bead 24 maintained in the position shown with respect to the casing 12 by a retainer 25. The pressure responsive unit further comprises an outer annular plate 28 having at its periphery an annular flange 29 coaxial with and spaced from the circumferential wall of the casing 12. The diaphragm 23 extends over and in contact with the outer face of the flange 29. An inner annular plate 30 is normally arranged in the plane of the plate 28 and peripherally spaced therefrom. The plate 30 is further described below.

The pressure responsive unit further comprises a relatively stiff plate 32, the radially inner portion of which lies flat against the adjacent portion of the plate 30. At circumferentially spaced points, the radially outer edge portion of the plate 32 is provided with rearwardly extending fingers 33 each arranged in a notch 34 formed in a radially outer plate 35. The fingers 33 and notches 34 may be of any desired number, equally spaced circumferentially around the axis of the motor, and these elements have been shown as being six in the present instance, as will be apparent in Figure 2. The plate 35 is secured to the plate 28 and to adjacent portions 36 of the diaphragm 23 by bolts 37. The fingers 33 position the plates 32 and 35 with respect to each other circumferentially of the apparatus, and it will become apparent that the plates 32 and 35 are adapted to partake of limited movement relative to each other axially of the motor. The inner periphery of the diaphragm portion 36 is provided with a bead 39 clamped between the plates 30 and 32.

Figure 3:
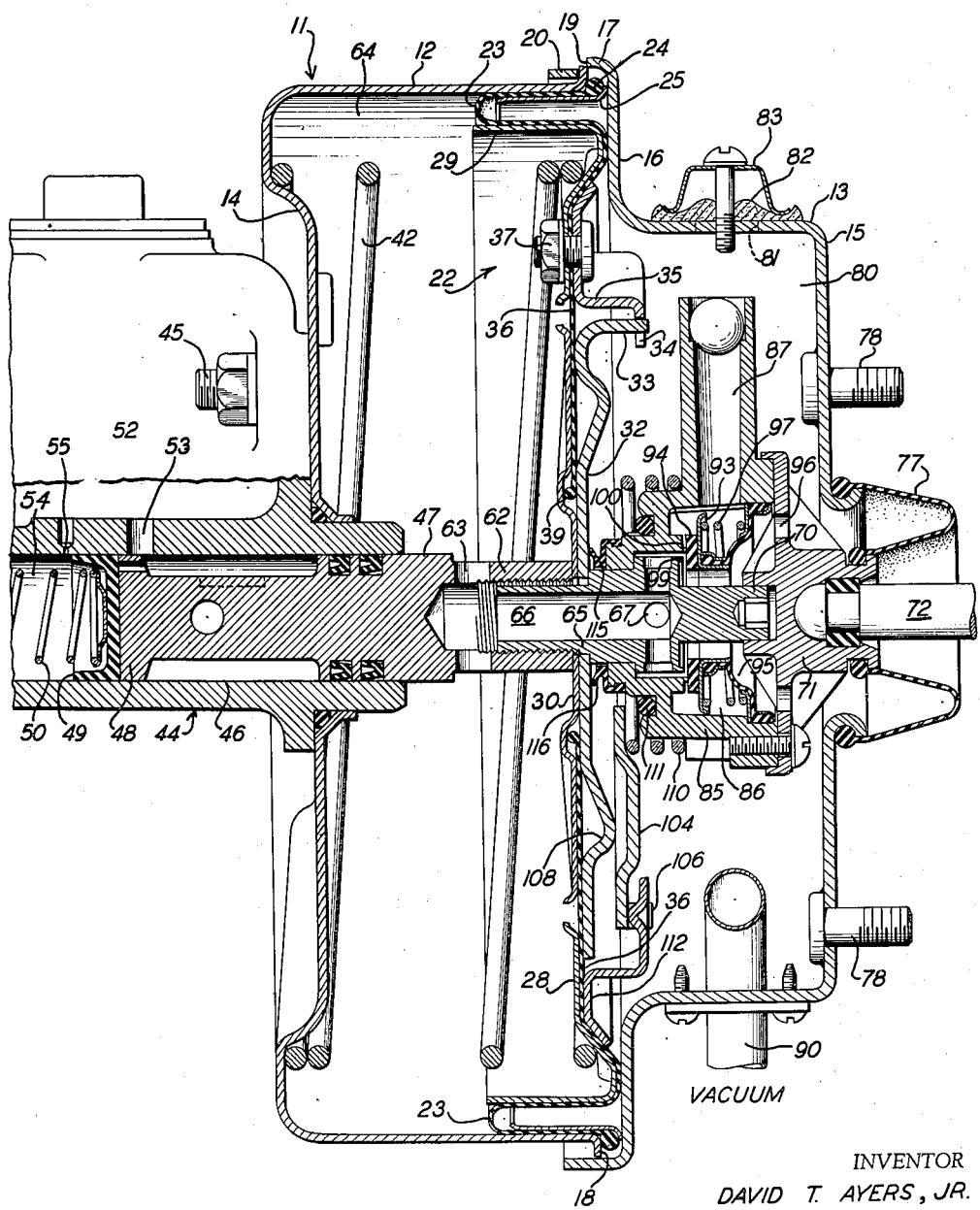
Figure 3 is a section taken substantially on line 3—3 of Figure 2, the parts being shown in normal off positions.

Referring to Figure 3, it will be apparent that the shoulder formed by the wall 16 is engageable by the adjacent portion of the diaphragm 23 to limit movement of the pressure responsive unit 22 to the off position. A return spring 42 biases the pressure responsive unit 22 to such position.

A master cylinder 44 is secured by bolts or the like 45 to the wall 14 of the casing section 12 and is provided therein with a bore 46 in which is slidable a fluid displacing plunger 47. This plunger is provided at one end with a head 48 against which is arranged a cup 49 engaged by a spring device 50 to bias the plunger 47 to its off position shown in Figure 3, the spring 50 usually being employed to engage the residual pressure valve (not shown) in the end of the master cylinder.

The master cylinder is provided with a conventional reservoir 52 which supplies fluid back of the head 48 through the usual port 53. The plunger 47 displaces fluid from a chamber 54 upon operation of the brake mechanism, and such chamber communicates with the reservoir through an orifice 55 just ahead of the cup 49 when the latter is in normal position. Fluid displaced from the master cylinder flows through lines 58 to the usual wheel cylinders 59 (Figure 1).

Figure 2:
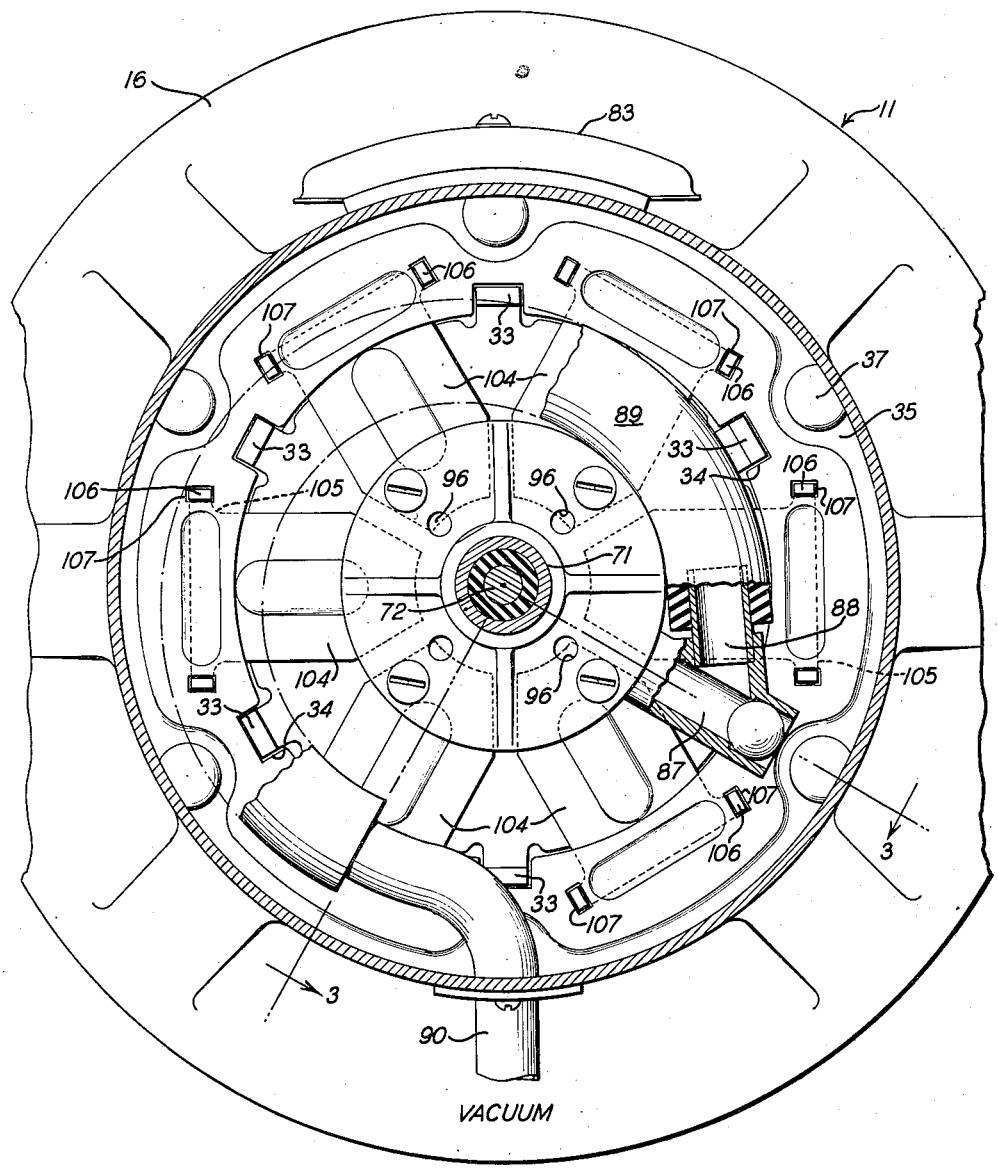
Figure 2 is an enlarged fragmentary sectional view on line 2—2 of Figure 1.

The master cylinder plunger 47 is provided with a rearward axial tubular extension 62 the interior of which communicates through ports 63 with the motor chamber 64 formed to the left of the pressure responsive unit 22 and constituting the variable pressure chamber of the motor. A valve body 65 has its forward end threaded into the extension 62 and is provided with an axial passage 66 communicating at its rear end with radial ports 67. The valve body 65, when screwed tightly into position in the extension 62, clamps the radially inner portions of the plates 30 and 32 as shown in Figures 2 and 3.

Rearwardly of the ports 67, the valve body 65 is provided with an axial extension 70 forming a pilot slidable in a head 71. This head has suitable connection with a push rod 72 connected as at 73 (Figure 1) with a depending brake pedal 74 pivotally supported at its upper end as at 75 and having a pedal pad 76 at its lower end. A boot 77 is connected between the head 71 and the casing wall 15 as shown in Figures 2 and 3. The wall 15 engages solidly against the fire wall 10 and is secured thereto preferably by bolts 78, the fire wall of course having an opening through which the boot 77 projects, as will be obvious.

The space to the right of the pressure responsive unit 22 and within the casing 13 forms an atmospheric chamber 80 communicating with the atmosphere in any suitable manner, for example through ports 81 covered by an air cleaning element 82 suitably held in position by a clamping member 83. A housing 85 is arranged within the chamber 80 and forms therein a vacuum chamber 86 communicating through a passage 87 (Figures 2, 3 and 4) and through a nipple 88 with a circular hose or pigtail 89, the other end of which is connected to one end of an elbow 90 extending through the motor casing 13 and suitably connected to a source of vacuum such as the intake manifold of the vehicle engine.

Within the housing 85 is arranged a diaphragm 92 secured at its radially outer extremity to the wall of the housing 85. The radially inner periphery of the diaphragm 92 is secured to a body structure including a metallic thimble 93 against one face of which is secured a resilient valve seat 94. Within the housing 85 and to the right of the diaphragm 92, as viewed in Figures 3 and 4, is an atmospheric chamber 95 communicating with the chamber 80 through ports 96. The chamber 95, in turn, communicates with the interior of the thimble 93. A spring 97 biases the thimble 93 to the left as viewed in Figures 3 and 4.

The ports 67 extend through an annular enlargement on the valve body 65, and such enlargement is provided at its outer extremity with an annular valve 99 facing toward the valve seat 94 and normally disengaged therefrom as shown in Figure 3. Surrounding the valve 99 is a cooperating valve 100 preferably formed integral with the housing 85. This valve is radially spaced from the valve 99 to form a space communicating with the ports 67. The valve 100 is normally engaged with the valve seat 94 as shown in Figure 3.

At a position between each adjacent pair of the lips 33, and thus corresponding in number thereto, is a plurality of lever elements 104. Each of these lever elements is provided at its radially outer extremity with laterally extending tabs 105 terminating in projecting lips 106, each such lip being arranged in an opening 107 formed in the plate 35. The plate 32 is provided with an annular rib 108 engaging all of the levers 104 to act as a fulcrum therefor. Thus each lever is pivoted to rock with respect to the plate 35, and about the fulcrum provided by the rib 108, for example from the normal position shown in Figure 3 to an operative position as shown in Figure 4. A coil spring 110, mounted on the housing 85, bears against the radially inner ends of the levers 104 and urges them toward the left as viewed in Figures 3 and 4. When the levers 104 swing against the tension of the spring 110 as described below, they come into contact with a resilient ring 111 carried by the housing 85. It will be noted that the plate 35 is provided with a radially outer annular wall 112 which bears against the adjacent diaphragm portion 36 radially outwardly of the plate 32. The plate 28 is free of connection with the plate 30. Thus the plate 35, the radially outward portion of the diaphragm 36 and the plate 28 are free to move within reasonable limits to the left of the normal position shown in Figure 3 when pressure is higher in the chamber 80 than in the motor chamber 64, and under such conditions the plate 35 will exert force on the radially outer ends of the levers 104.

It will become apparent that atmospheric pressure is always present in the chamber 80, whereas during motor operation, air will be exhausted from the motor chamber 64. Under such condition, there will be a differential pressure existing between the ports 67 and the space surrounding such ports, and the chamber 80. Therefore, some leakage of air might occur around the sliding connection between the valve body 65 and housing 85. To prevent such leakage, the housing 85 is provided with a seal 115 having a normally angularly arranged annular lip 116 (Figure 3) engaging against the plate 32. This lip is arranged angularly to provide for movement of the valve body 85 from the position shown in Figure 3 to that shown in Figure 4, and the lip positively seals against leakage of the type referred to above.

*Operation*

The parts normally occupy the positions shown in Figure 3. Under such conditions, the valve 100 is in engagement with the valve seat 94 while the latter is disengaged from the valve 99. The axial passage 66 therefore will be in communication with the atmosphere through chamber 95, ports 96, chamber 80 and air cleaner 82. Thus atmospheric pressure will be present in the motor chamber 64, and the motor will be atmosphere-suspended.

When the brakes are to be operated, the pedal pad 76 (Figure 1) will be depressed by the operator, thus effecting movement of the push rod 72 to the left from the position shown in Figure 3. As distinguished from conventional prior constructions wherein the valve is operated under such conditions, the housing 85 will be moved bodily in the present construction. The valve 100 obviously moves with the housing 85, and the action of the spring 97 causes the seat 94 to follow such movement until the seat 94 engages the valve 99. The parts will now be in lap position, with the motor chamber 64 disconnected from the atmosphere.

Slight further movement of the push rod 72 moves the valve 100 out of engagement with the seat 94. This seat cannot continue to follow the valve 100 since it will now be in engagement with the valve 99. The ports 67, accordingly, will be cracked to the chamber 86, which is in communication with the source of vacuum through the passage 87 and pigtail 89. Therefore air will be exhausted from the motor chamber 64 and since atmospheric pressure is always present in the chamber 80, the pressure responsive unit 22 will start to move to the left from the position shown in Figure 3. Since the pressure responsive unit is connected to the master cylinder plunger 47, such plunger will move to the left to displace fluid from the chamber 54 through lines 58 (Figure 1) to the brake cylinders 59.

During initial movement of the pressure responsive unit, that is, during such period of operation as is necessary to move the brake shoes from their normal positions into engagement with the brake drums, the plates 28, 30, 32 and 35 of the pressure responsive unit will move as a unit and, accordingly, will retain the relative positions shown in Figure 3. In other words, the annular plate portion 112 (Figure 3) will remain substantially in the plane of the body of the plate 32.

During initial brake movement, since the housing 85 is slidable on the valve body 65, the only resistance to movement of the brake pedal provided in the apparatus will be the force exerted by the spring 110 minus the force of the spring 97. The loading of the spring 110 incident to depression of the brake pedal will tend to swing the radially inner ends of the levers 104 to the left in Figure 3. However, such tendency is overcome by differential pressures between the chambers 80 and 64 as the motor becomes activated. As a matter of fact, the differential pressures acting on the annular plate portion 112 and associated elements transmits some initial reaction back through the spring 110 to the housing 85 and through the push rod 72 to the brake pedal. While this reaction is relatively slight, it will be proportional to the degree of energization of the motor.

As soon as the brake shoes engage the drums, there will be an immediate resistance to the displacement of fluid from the master cylinder chamber 54, thus retarding movement of the plate 32 of the pressure responsive unit. As previously stated, the plates 28 and 35 are free to move to the left of the position shown in Figure 3. Therefore, whereas initial contact of the brake shoes with the drums retards movement of the plunger 47 and plate 32, no such resistance occurs to movement of the plates 28 and 112 and the portions of the pressure responsive unit connected thereto. Such portions of the pressure responsive unit, under the influence of differential pressures in the chambers 64 and 80, therefore, will move to the left of the positions shown in Figure 3 to the positions shown, for example, in Figure 4. This relative movement of the parts effects movement of the radially outer ends of the levers 104 to the left of their normal positions, and the rocking of the levers about the fulcrum rib 108 causes movement of the radially inner ends of the levers 104 to the right to the position shown, for example, in Figure 4.

Such operation of the levers 104 thus is utilized for transmitting reaction forces to the housing 85 which is connected to the push rod 72, and these reaction forces, of course, will be proportional to the degree of energization of the motor and will be transmitted to the brake pedal. The reaction forces just referred to will be first transmitted through the spring 110 by increasing the loading thereof, after which the radially inner ends of the levers will contact the cushion ring 111. This ring acts to transmit direct reaction forces to the housing 85 and eliminates any noise occurring incident to engagement of the levers with the housing 85.

The operation just described will continue substantially to the point of "power run-out" of the motor, that is, the point at which the motor becomes fully activated in accordance with the maximum differential pressures available for operating the motor. It will be noted that the pilot 70 has its extremity slightly spaced from the recess in the head 71 in which it is arranged, and, if further brake application is desired beyond the point of "power run-out" of the motor, a positive abutting engagement will occur between the end of the pilot 70 and the head 71, after which forces will be directly applied from the push rod 72 to the valve body 65 and thus to the plunger 47. Maximum brake application therefore will depend solely upon the ability of the operator to exert force against the brake pedal after the point of power run-out.

As previously stated, the seal 115 prevents leakage around the valve body 65 into the ports 67. Under normal conditions, when the brake is not being operated, atmospheric pressure will be present both in the passage 66 and chamber 80, and there will be no tendency for the occurrence of leakage of the character referred to. During motor energization, vacuum will be present in the passage 66 and substantial differential pressure can be exerted on the lip 116 of the seal 115. This pressure will be radially inward and will tend more tightly to seat the lip 116. At the same time, this lip is flexible and is free to be flexed from the position shown in Figure 3 to that shown in Figure 4. The lip of the seal therefore seals against leakage while at the same time providing for the necessary relative movement of the housing 85 to the left of its normal position shown in Figure 3 for energizing the motor.

The brakes are released, as will be apparent, merely by releasing the brake pedal. The spring 110 will have been previously maintained loaded by pressure on the brake pedal, and when such pressure is released, the spring 110 immediately exerts a force on the housing 85 to move the latter to the right from the position shown in Figure 4 to that shown in Figure 3. Such movement causes the valve 100 to move into engagement with the seat 94 and move such seat out of engagement with the valve 99. The valve parts will then reassume the positions shown in Figure 3, thereby reconnecting the motor chamber 64 to the atmosphere. The return spring 42 will then promptly return the pressure responsive unit to its normal position. Such movement obviously retracts the master cylinder plunger 47, assisted by the master cylinder spring 50. The relieving of pressure from the spring 110 will also swing the levers 104 back to their normal positions. It will be noted that the casing wall 16 provides a shoulder engageable with the adjacent portion of the diaphragm to limit movement of the parts to the off positions shown in Figure 3. This operation limits movement to the right in Figure 3 of the radially outer portion of the plate 28 against which the return spring 42 exerts its force. The master cylinder return spring 50 exerts force on and returns fully to normal positions the plunger 47, plates 30 and 32, and valve body 65. At normal positions of such parts, the force of the spring 50 is overcome by the spring 110, acting through the levers 104.

It will be apparent that the present construction embodies in effect a unitary casing having only two main motor chambers, namely the chambers 64 and 80, all of the valve mechanism and operating parts therefor being arranged in the chamber 80. It also will be noted that the chamber 80 can be of smaller diameter than the chamber 64, thus providing for the use of the wall portion 16 as a stop for the pressure responsibe unit without encumbering the axial portion of the mechanism, such as the right-hand end of the master cylinder 44, with any stop means. Thus the axial structure of the unit including the master cylinder plunger, and the means for connecting it to the pressure responsive unit is simplified, and the same is true of the right-hand end of the master cylinder. Moreover, the over-all diameter of the motor casing unit is reduced by eliminating coaxial flanges which have to be bolted together. It merely is necessary in assembling the device to slide the outer flange of the casing 13 over the annular flange 18 of the casing 12, and then bend inwardly the portions 20 (Figure 1) of the flange of the casing 13.

The present device provides a highly efficient direct acting power brake wherein all forces transmitted through the apparatus are coaxial to eliminate any tendency for the binding of any of the parts. All of the parts are thus free to move relative to each other to provide the operational characteristics referred to above. Moreover, the mechanism forms a compact unit embodying in direct association therewith a conventional master cylinder directly carried by the motor casing 12.

It is to be understood that the form of the invention shown and described is to be taken as a preferred example of the same and that various changes in the shape, size, and arrangement of the parts may be made as do not depart from the spirit of the invention and the scope of the appended claims.

I claim:

1. In a booster mechanism, a motor comprising a casing, a pressure responsive unit therein dividing said casing to form a variable pressure chamber and a constant pressure chamber open to the atmosphere, a member to be operated connected at one end to said pressure responsive unit coaxially thereof and projecting through said variable pressure chamber, a valve housing in said constant pressure chamber movable axially relative to said pressure responsive unit and provided with a valve seat relatively movable axially thereof, a pair of coaxial annular valves facing toward said valve seat and engageable therewith, the outer of said valves being carried by said valve housing and normally engaging said valve seat and the inner of said valves being connected to said member to be operated and normally disengaged from said valve seat to open said variable pressure chamber to the atmosphere, said housing having a space radially outwardly of said outer valve connected to a source of vacuum, means projecting into said constant pressure chamber and engaging said housing to move it axially toward said pressure responsive unit to open said outer valve and close said inner valve to connect said variable pressure chamber to the source of vacuum, and means connected between a portion of said pressure responsive unit and said valve housing for reacting against valve operating movement thereof proportional to differential pressures in said constant and variable pressure chambers.

2. In a booster mechanism, a motor comprising a casing, a pressure responsive unit therein dividing said casing to form a variable pressure chamber and a constant pressure chamber open to the atmosphere, a member to be operated connected at one end to said pressure responsive unit coaxially thereof and projecting through said variable pressure chamber, a valve housing in said constant pressure chamber movable axially relative to said pressure responsive unit and provided with a valve seat relatively movable axially thereof, a pair of coaxial annular valves facing toward said valve set and engageable therewith, the outer of said valves being carried by said pressure responsive unit and normally engaging said valve seat and the inner of said valves being connected to said member to be operated and normally disengaged from said valve seat to open said variable pressure chamber to the atmosphere, said housing having a space radially outwardly of said outer valve connected to a source of vacuum, means projecting into said constant pressure chamber and engaging said housing to move it axially toward said pressure responsive unit to open said outer valve and close said inner valve to connect said variable pressure chamber to the source of vacuum, said pressure responsive unit comprising a radially inner portion fixed to said member to be operated and a radially outer portion axially movable relative to said radially inner portion, and means for transmitting reaction forces from said pressure responsive unit to said housing comprising lever means mounted to fulcrum on said radially inner portion and engaging at its radially inner and outer ends respectively with said housing and with said radially outer portion of said pressure responsive unit.

3. A mechanism according to claim 2 wherein said lever means comprises a plurality of circumferentially spaced radial levers, said radially inner portion of said pressure responsive unit having an annular rib engaging all of said levers, and a cushion ring arranged between the radially inner ends of said levers and said housing to transmit reaction forces to the latter.

4. A mechanism according to claim 2 wherein said lever means comprises a plurality of circumferentially spaced radial levers, said radially inner portion of said pressure responsive unit having an annular rib engaging all of said levers, a cushion ring arranged between the radially inner ends of said levers and said housing to transmit reaction forces to the latter, and a coil spring surrounding and coaxial with said housing and engaging at one end thereagainst, the other end of said spring engaging the radially inner ends of said levers.

5. In a booster mechanism, a motor comprising a casing, a pressure responsive unit in said casing dividing it to form a constant pressure chamber communicating with the atmosphere and a variable pressure chamber, a member to be operated fixed to said pressure responsive unit coaxially thereof and having an axial passage opening at one end into said variable pressure chamber, a valve housing in said constant pressure chamber movable axially relative to said pressure responsive unit and having a first chamber communicating with the other end of said axial passage, a valve seat device in said housing having a resilient valve seat element and a diaphragm connected to said housing and forming therewith a second chamber and a third chamber, the latter of which communicates with said constant pressure chamber, means connecting said second chamber to a source of vacuum, inner and outer coaxial annular valves engageable with said valve seat element, said outer valve being carried by said housing and normally engaging said valve seat element, said inner valve being carried by said member to be operated and being normally disengaged from said valve seat element, whereby said first chamber normally communicates with said third chamber and said first chamber is disconnected from said second chamber, means projecting axially into said constant pressure chamber and engaging said housing to move it toward said pressure responsive unit, a spring biasing said valve seat element toward said valves whereby, upon said movement of said housing, said valve seat element will engage said inner valve and said outer valve will move away from said valve seat element to disconnect said first and third chambers and connect said first chamber to said second chamber to exhaust air from said variable pressure chamber, and means connected between said pressure responsive unit and said housing for opposing said movement thereof to a degree proportional to differential pressures in said constant and variable pressure chambers.

6. In a booster mechanism, a motor comprising a casing, a pressure responsive unit in said casing dividing it to form a constant pressure chamber communicating with the atmosphere and a variable pressure chamber, a member to be operated fixed to said pressure responsive unit coaxially thereof and having an axial passage opening at one end into said variable pressure chamber, a valve housing in said constant pressure chamber movable axially relative to said pressure responsive unit and having a first chamber communicating with the other end of said axial passage, a valve seat device in said housing having a resilient valve seat element and a diaphragm connected to said housing and forming therewith a second chamber and a third chamber, the latter of which communicates with said constant pressure chamber, means connecting said second chamber to a source of vacuum, inner and outer coaxial annular valves engageable with said valve seat element, said outer valve being carried by said housing and normally engaging said valve seat element, said inner valve being carried by said member to be operated and being normally disengaged from said valve seat element, whereby said first chamber normally communicates with said third chamber and said first chamber is disconnected from said second chamber, means projecting axially into said constant pressure chamber and engaging said housing to move it toward said pressure responsive unit, a spring biasing said valve seat element toward said valves whereby, upon said movement of said housing, said valve seat element will engage said inner valve and said outer valve will move away from said valve seat element to disconnect said first and third chambers and connect said first chamber to said second chamber to exhaust air from said variable pressure chamber, said pressure responsive unit comprising a radially inner portion connected to said member to be operated and a radially outer portion movable relative to said radially inner portion, and lever means connected between said radially outer portion and said housing to oppose said movement of the latter in accordance with differential pressures affecting said outer portion of said pressure responsive unit.

7. In a booster mechanism, a motor comprising a casing, a pressure responsive unit in said casing dividing it to form a constant pressure chamber communicating with the atmosphere and a variable pressure chamber, a member to be operated fixed to said pressure responsive unit coaxially thereof and having an axial passage opening at one end into said variable pressure chamber, a valve housing in said constant pressure chamber movable axially relative to said pressure responsive unit and having a first chamber communicating with the other end of said axial passage, a valve seat device in said housing having a resilient valve seat element and a diaphragm connected to said housing and forming therewith a second chamber and a third chamber, the latter of which communicates with said constant pressure chamber, means connecting said second chamber to a source of vacuum, inner and outer coaxial annular valves engageable with said valve seat element, said outer valve being carried by said housing and normally engaging said valve seat element, said inner valve being carried by said member to be operated and being normally disengaged from said valve seat element, whereby said first chamber normally communicates with said third chamber and said first chamber is disconnected from said second chamber, means projecting axially into said constant pressure chamber and engaging said housing to move it toward said pressure responsive unit, a spring biasing said valve seat element toward said valves whereby, upon said movement of said housing, said valve seat element will engage said inner valve and said outer valve will move away from said valve seat element to disconnect said first and third chambers and connect said first chamber to said second chamber to exhaust air from said variable pressure chamber, said pressure responsive unit comprising a radially inner portion connected to said member to be operated and a radially outer portion movable relative to said radially inner portion, said radially inner portion having an annular fulcrum rib projecting into said constant pressure chamber, and a plurality of circumferentially spaced radial levers engaging intermediate their ends with said rib, said levers having mechanical engagement at their ends respectively with said radially outer portion of said pressure responsive unit and with said housing.

8. In a booster mechanism, a motor comprising a casing, a pressure responsive unit in said casing dividing it to form a constant pressure chamber communicating with the atmosphere and a variable pressure chamber, a member to be operated fixed to said pressure responsive unit coaxially thereof and having an axial passage opening at one end into said variable pressure chamber, a valve housing in said constant pressure chamber movable axially relative to said pressure responsive unit and having a first chamber communicating with the other end of said axial passage, a valve seat device in said housing having a resilient valve seat element and a diaphragm connected to said housing and forming therewith a second chamber and a third chamber, the latter of which communicates with said constant pressure chamber, means connecting said second chamber to a source of vacuum, inner and outer coaxial annular valves engageable with said valve seat element, said outer valve being carried by said housing and normally engaging said valve seat element, said inner valve being carried by said member to be operated and being normally disengaged from said valve seat element, whereby said first chamber normally communicates with said third chamber and said first chamber is disconnected from said second chamber, means projecting axially into said constant pressure chamber and engaging said housing to move it toward said pressure responsive unit, a spring biasing said valve seat element toward said valves whereby, upon said movement of said housing, said valve seat element will engage said inner valve and said outer valve will move away from said valve seat element to disconnect said first and third chambers and connect said first chamber to said second chamber to exhaust air from said variable pressure chamber, said pressure responsive unit comprising a radially inner portion connected to said member to be operated and a radially outer portion movable relative to said radially inner portion, said radially inner portion having an annular fulcrum rib projecting into said constant pressure chamber, a plurality of circumferentially spaced radial levers engaging intermediate their ends with said rib, said levers having mechanical engagement at their ends respectively with said radially outer portion of said pressure responsive unit and with said housing, and a coil spring surrounding said housing and engaging at one end thereagainst, the other end of such spring engaging the radially inner ends of said levers to oppose movement thereof toward said housing.

9. In a booster mechanism, a motor comprising a casing, a pressure responsive unit in said casing dividing it to form a constant pressure chamber communicating with the atmosphere and a variable pressure chamber, a member to be operated fixed to said pressure responsive unit coaxially thereof and having an axial passage opening at one end into said variable pressure chamber, a valve housing in said constant pressure chamber movable axially relative to said pressure responsive unit and having a first chamber communicating with the other end of said axial passage, a valve seat device in said housing having a resilient valve seat element and a diaphragm connected to said housing and forming therewith a second chamber and a third chamber, the latter of which communicates with said constant pressure chamber, means connecting said second chamber to a source of vacuum, inner and outer coaxial annular valves engageable with said valve seat element, said outer valve being carried by said housing and normally engaging said valve seat element, said inner valve being carried by said member to be operated and being normally disengaged from said valve seat element, whereby said first chamber normally communicates with said third chamber and said first chamber is disconnected from said second chamber, means projecting axially into said constant pressure chamber and engaging said housing to move it toward said pressure responsive unit, a spring biasing said valve seat element toward said valves whereby, upon said movement of said housing, said valve seat element will engage said inner valve and said outer valve will move away from said valve seat element to disconnect said first and third chambers and connect said first chamber to said second chamber to exhaust air from said variable pressure chamber, said pressure responsive unit comprising a radially inner portion connected to said member to be operated and a radially outer portion axially movable relative to said radially inner portion, and a diaphragm connected between said portions of said pressure responsive unit and connected at its radially outer extremity to said casing, and means connected between said radially outer portion and said housing for utilizing axial movement of said radially outer portion relative to said radially inner portion incident to said differential pressures in said constant and variable pressure chambers for opposing said movement of said housing.

10. In a booster mechanism, a motor comprising a casing, a pressure responsive unit in said casing dividing it to form a constant chamber communicating with the atmosphere and a variable pressure chamber, a member to be operated fixed to said pressure responsive unit coaxially thereof and having an axial passage opening at one end into said variable pressure chamber, a valve housing in said constant pressure chamber movable axially relative to said pressure responsive unit and having a first chamber communicating with the other end of said axial passage, a valve seat device in said housing having a resilient valve seat element and a diaphragm connected to said housing and forming therewith a second chamber and a third chamber, the latter of which communicates with said constant pressure chamber, means connecting said second chamber to a source of vacuum, inner and outer coaxial annular valves engageable with said valve seat element, said outer valve being carried by said housing and normally engaging said valve seat element, said inner valve being carried by said member to be operated and being normally disengaged from said valve seat element, whereby said first chamber normally communicates with said third chamber and said first chamber is disconnected from said second chamber, means projecting axially into said constant pressure chamber and engaging said housing to move it toward said pressure responsive unit, a spring biasing said valve seat element toward said valves whereby, upon said movement of said housing, said valve seat element will engage said inner valve and said outer valve will move away from said valve seat element to disconnect said first and third chambers and connect said first chamber to said second chamber to exhaust air from said variable pressure chamber, said pressure responsive unit comprising a radially inner portion connected to said member to be operated and a radially outer portion axially movable relative to said radially inner portion, and a diaphragm connected between said portions of said pressure responsive unit and connected at its radially outer extremity to said casing, a plurality of circumferentially spaced radial levers having rocking connection at their radially outer ends with said radially outer portion of said pressure responsive unit, said radially inner portion having an annular fulcrum rib engaging all of said levers intermediate their ends, the radially inner ends of said levers being normally spaced from said housing and movable into engagement therewith to react against movement thereof upon swinging movement of said levers incident to axial movement of said radially outer portion of said pressure responsive unit relative to said radially inner portion.

11. A mechanism according to claim 10 provided with a spring surrounding said housing and engaging at one end thereagainst, the other end of said spring engaging the inner ends of said levers to oppose movement thereof toward said housing.

12. In a booster mechanism, a motor comprising a casing formed of a pair of coacting casing sections having peripheral portions secured to each other, a pressure responsive unit in said casing dividing it to form a variable pressure chamber and a constant pressure chamber open to the atmosphere, the casing section in which said constant pressure chamber is formed having a cylindrical portion smaller in diameter than the peripheral portion of such casing section and having an annular wall perpendicular to the axis of said casing, said pressure responsive unit having an annular portion larger in diameter than said cylindrical portion of said last-named casing section and engageable with said annular wall to limit movement of said pressure responsive unit to its normal off position, a member to be operated connected to said pressure responsive unit, said member to be operated extending through said pressure responsive unit and having a passage opening at one end into said variable pressure chamber, and a valve mechanism in said constant pressure chamber having fluid connection with said constant pressure chamber, with said passage and with a source of vacuum, and normally connecting said passage to said constant pressure chamber, said valve mechanism being operative to disconnect said passage from said constant pressure chamber and connect it to said vacuum source.

13. In a booster mechanism, a motor comprising a casing, a pressure responsive unit in said casing dividing it to form a variable pressure chamber, and a constant pressure chamber open to the atmosphere, a return spring biasing said pressure responsive unit to a normal off position, means engaging said pressure responsive unit to limit its movement to said off position, a member to be operated connected to said pressure responsive unit, such member extending through said pressure responsive unit and having a passage opening at one end into said variable pressure chamber and having ports at its other end opening radially through such member, a valve mechanism in said constant pressure chamber comprising a housing coaxial with said member to be operated and surrounding the adjacent end of said member to be operated in spaced relation to said ports, a valve seat element in said housing, an inner annular valve carried by said member to be operated normally spaced from said valve seat element, an outer annular valve carried by said housing and normally engaging said valve seat element, said housing being axially movable relative to said member to be operated to move said valve seat element into engagement with said inner valve and to move said outer valve out of engagement with said valve seat element to disconnect said ports from the atmosphere and connect them around said outer valve to a source of vacuum, said pressure responsive unit having a radially inner plate connected to said member to be operated, the end of said housing adjacent said plate being normally spaced therefrom, and an annular seal carried by said end of said housing and provided with a normally conical lip having an annular edge engaging said plate to seal said constant pressure chamber from said ports.

14. In a booster mechanism, a motor comprising a casing formed of a pair of coacting casing sections having peripheral portions secured to each other, a pressure responsive unit in said casing dividing it to form a variable pressure chamber and a constant pressure chamber open to the atmosphere, the casing section in which said constant pressure chamber is formed having an annular wall perpendicular to the axis of said casing and engageable with said pressure responsive unit to limit movement thereof to its normal off position, a member to be operated connected to said pressure responsive unit, said member to be operated extending through said pressure responsive unit and having a passage opening at one end into said variable pressure chamber, said pressure responsive unit comprising a radially inner portion to which said member to be operated is connected and a radially outer portion overlying said radially inner portion to the side thereof adjacent said variable pressure chamber, and a diaphragm connected between said radially inner and outer portions and connected at its periphery to said casing, said diaphragm providing for relative axial movement of said inner and outer portions, a return spring engaging at one end against the other casing section and at its other end against said radially outer portion of said pressure responsive unit, a valve mechanism in said constant pressure chamber having fluid connection with said constant pressure chamber, with said passage and with a source of vacuum, and normally connecting said passage to said constant pressure chamber, said valve mechanism being operative to disconnect said passage from said constant pressure chamber and connect it to said vacuum source, and mechanical means engaging said portions of said pressure responsive unit and operative for opposing motor energizing movement of said valve mechanism upon relative axial movement of said radially outer and inner portions incident to different pressures in said constant and variable pressure chambers.

15. A mechanism according to claim 14 wherein said valve mechanism includes a member manually axially movable to operate said valve mechanism, said mechanical means comprising elements connected between said pressure responsive unit and said manually movable member for opposing valve operating movements of the latter in proportion to differential pressures between said constant and variable pressure chambers.

16. A mechanism according to claim 14 wherein said valve mechanism includes a member manually axially movable to operate said valve mechanism, said mechanical means comprising a plurality of circumferentially spaced radial levers fulcrumed intermediate their ends on said radially inner portion of said pressure responsive unit, said levers being engaged at their radially outer ends with said radially outer portion of said pressure responsive unit and at their radially inner ends against said manually movable member.

17. A mechanism according to claim 16 provided with a spring in said constant pressure chamber engaging at one end against said manually movable member and at its other end against the radially inner ends of said levers.

References Cited in the file of this patent

UNITED STATES PATENTS

| | | |
|---|---|---|
| 2,197,075 | Fitzgerald | Apr. 16, 1940 |
| 2,826,177 | Price | Mar. 11, 1958 |
| 2,832,316 | Ingres | Apr. 29, 1958 |
| 2,842,101 | Price | Aug. 8, 1958 |